US008927912B2

(12) United States Patent
Kim et al.

(10) Patent No.: US 8,927,912 B2
(45) Date of Patent: Jan. 6, 2015

(54) SEALANT CURING APPARATUS

(75) Inventors: Beong-Ju Kim, Yongin (KR); Sung-Chul Kim, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 415 days.

(21) Appl. No.: 13/313,499

(22) Filed: Dec. 7, 2011

(65) Prior Publication Data

US 2012/0312802 A1 Dec. 13, 2012

(30) Foreign Application Priority Data

Jun. 10, 2011 (KR) ........................ 10-2011-0056285

(51) Int. Cl.
*H05B 3/02* (2006.01)
*H05B 3/84* (2006.01)
*C09K 19/02* (2006.01)

(52) U.S. Cl.
CPC ........................................ *H05B 3/84* (2013.01)
USPC ............ 219/546; 219/390; 118/719; 349/173

(58) Field of Classification Search
USPC ...... 219/546, 390, 405, 411; 118/719, 723 E; 349/173, 110, 190
See application file for complete search history.

(56) References Cited

U.S. PATENT DOCUMENTS 6,808,592 B1 * 10/2004 Rigali et al. ............. 156/345.31
2011/0139767 A1 6/2011 Kim et al.
2012/0229736 A1 * 9/2012 Osaki et al. ..................... 349/96

FOREIGN PATENT DOCUMENTS

JP 2008-041255 A 2/2008
JP 2009-076417 A 4/2009
KR 10-2011-0067932 A 6/2011

* cited by examiner

*Primary Examiner* — Shawntina Fuqua
(74) *Attorney, Agent, or Firm* — Knobbe, Martens, Olson & Bear, LLP

(57) ABSTRACT

A sealant curing apparatus is disclosed. In one embodiment, the apparatus includes a processing object panel, a panel supporting unit supporting the processing object panel and a voltage applying unit including a first electrode and a second electrode positioned on the panel supporting unit via the processing object panel interposed therebetween and having different polarities. The processing object panel includes: i) a conductive layer pattern including a heating unit that includes a lattice (grid) pattern, a connecting unit coupled to the first electrode and the second electrode, and a coupling unit connecting the heating unit and the connecting unit and ii) a sealant formed according to the heating unit.

9 Claims, 3 Drawing Sheets

SEALANT CURING APPARATUS

RELATED APPLICATION

This application claims priority to and the benefit of Korean Patent Application No. 10-2011-0056285 filed in the Korean Intellectual Property Office on Jun. 10, 2011, the entire contents of which are incorporated herein by reference.

BACKGROUND

1. Field

The described technology generally relates to a sealant curing apparatus, more particularly, to a sealant curing apparatus for curing a sealant formed between a pair of substrates.

2. Description of the Related Technology

Recently, Flat panel display technologies such as an organic light emitting diode (OLED) display or a liquid crystal display (LCD) have been used in commercial products.

Those flat panel displays are generally manufactured by combining and sealing a pair of substrates arranged with a sealant formed between them.

SUMMARY

One inventive aspect is a sealant curing apparatus for substantially uniformly and effectively curing a sealant in a large area process.

Another aspect is a sealant curing apparatus which includes: a processing object panel; a panel supporting unit supporting the processing object panel; and a voltage applying unit including a first electrode and a second electrode positioned on the panel supporting unit via the processing object panel interposed therebetween and having different polarities. The processing object panel includes: a conductive layer pattern including a heating unit including a lattice (grid) pattern, a connecting unit coupled to the first electrode and the second electrode, and a coupling unit connecting the heating unit and the connecting unit; and a sealant formed according to the heating unit.

The processing object panel may further include a first substrate facing the panel supporting unit and a second substrate facing the voltage applying unit. The sealant may be disposed between the first substrate and the second substrate and combines the first substrate and the second substrate, and the heating unit of the conductive layer pattern may be formed at one surface of the second substrate to face the sealant.

The sealant may include a plurality of cell sealants forming cell units. The lattice pattern included in the heating unit may be formed to face the cell sealant.

The sealant curing apparatus may further include a first electrode transferring unit and a second electrode transferring unit to move the first electrode and the second electrode of the voltage applying unit, and a controller controlling the distance between the first electrode and the second electrode through the first electrode transferring unit and the second electrode transferring unit. A moving guide providing a moving path of the first electrode transferring unit and the second electrode transferring unit may be further included.

The panel supporting unit may include a supporting bar receiving the processing object panel, a supporting bar transferring unit to move the supporting bar, and a supporting bar driver to control the supporting bar transferring unit.

The supporting bar may include at least one vacuum hole. The sealant curing apparatus may further include a vacuum pump connected to the vacuum hole.

The supporting bar may include a plurality of sensors to sense the size of the processing object panel.

The controller may control the distance between the first electrode and the second electrode through the first electrode transferring unit and the second electrode transferring unit according to the size of the processing object panel sensed by a plurality of sensors.

DETAILED DESCRIPTION

Figure 1:
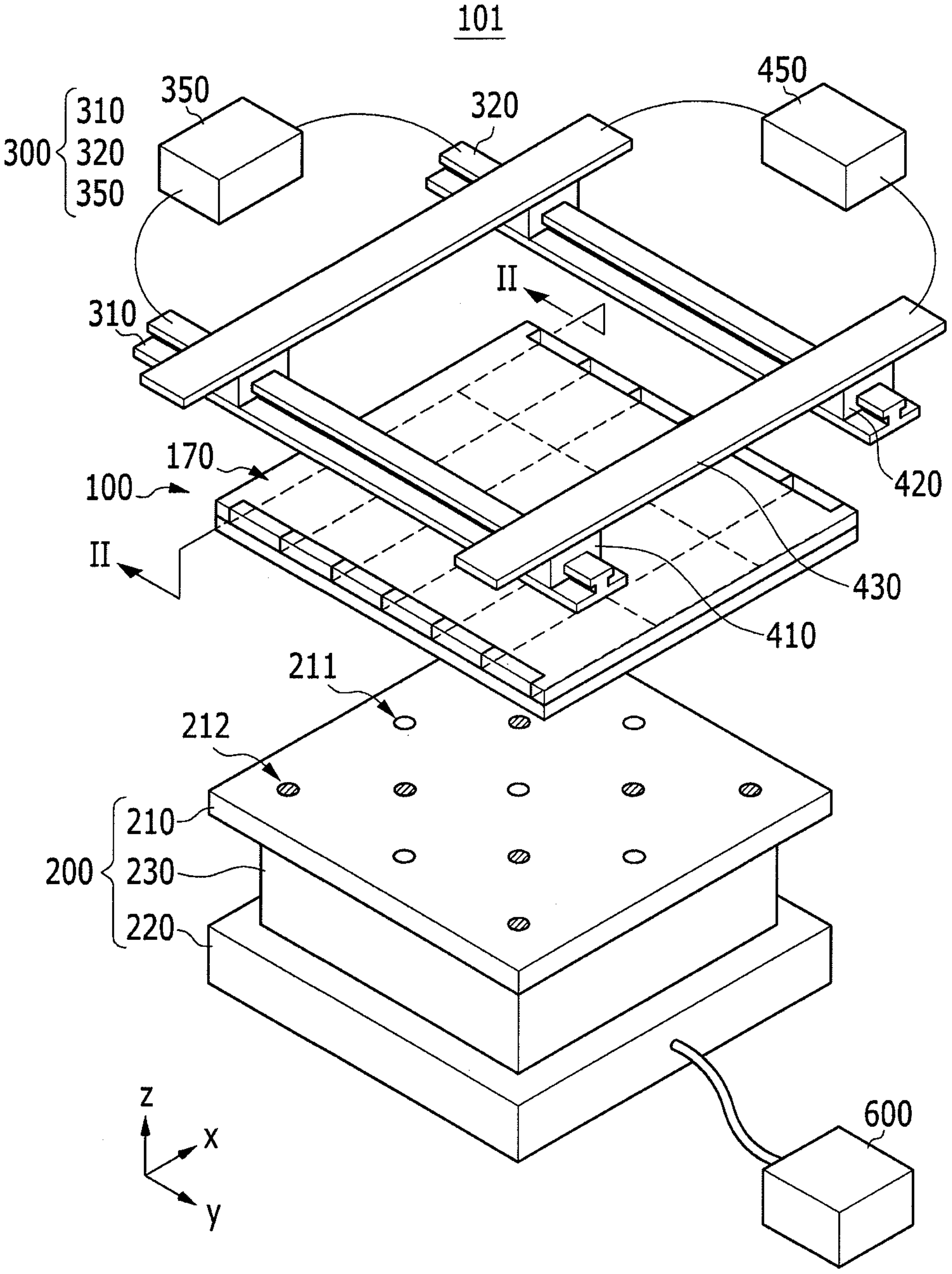
FIG. 1 is a perspective view of a sealant curing apparatus according to an embodiment.

Generally, to stably combine and seal a pair of substrates, the sealant must be uniformly cured. Currently, one method for curing the sealant includes laser irradiation.

There has been a recent trend to increase the area of the display device, and as the area increases, the sealant region also increases. As described above, if the region where the sealant is formed increases, it is difficult to uniformly cure the sealant through the curing method.

Also, it takes a relatively long time to cure the sealant by laser, and thereby the laser curing method reduces overall manufacturing efficiency.

Embodiments will be described more fully hereinafter with reference to the accompanying drawings. As those skilled in the art would realize, the described embodiments may be modified in various different ways.

Like reference numerals designate like elements throughout the specification.

Further, since sizes and thicknesses of constituent members shown in the accompanying drawings are arbitrarily given for better understanding and ease of description, in the drawings, the thickness of layers, films, panels, regions, etc., may be exaggerated for clarity. Accordingly, the disclosed embodiments are not limited to the illustrated sizes and thicknesses. It will be understood that when an element such as a layer, film, region, or substrate is referred to as being "on" another element, it can be directly on the other element or intervening elements may also be present.

Hereafter, a sealant curing apparatus 101 according to an embodiment will be described with reference to FIG. 1.

As shown in FIG. 1, the sealant curing apparatus 101 includes a panel supporting unit 200 supporting a processing object panel 100, and a voltage applying unit 300 electrically coupled to the processing object panel 100.

The panel supporting unit 200 moves the processing object panel 100 to a position where a voltage is applied by the voltage applying unit 300 to execute a sealant curing process while stably supporting the processing object panel 100. The panel supporting unit 200 includes a supporting bar 210 receiving the processing object panel 100, a supporting bar transferring unit 230 to move the supporting bar 210, and a supporting bar driver 220 to control the supporting bar transferring unit 230. Here, the supporting bar transferring unit 230 may move the supporting bar 210 up, down, right, and left.

The supporting bar 210 includes at least one vacuum hole 211 close to and supporting the processing object panel 100 by exhausting air between the processing object panel 100 and the supporting bar 210. Also, the sealant curing apparatus 101 further includes a vacuum pump 600 connected to the vacuum hole 211. The vacuum pump 600 exhausts air between the processing object panel 100 and the supporting bar 210 through the vacuum hole 211 such that the processing object panel 100 is stably close to and supported by the supporting bar 210.

Also, the supporting bar 210 may further include a plurality of sensors 212 to sense the size of the processing object panel 100.

Figure 2:
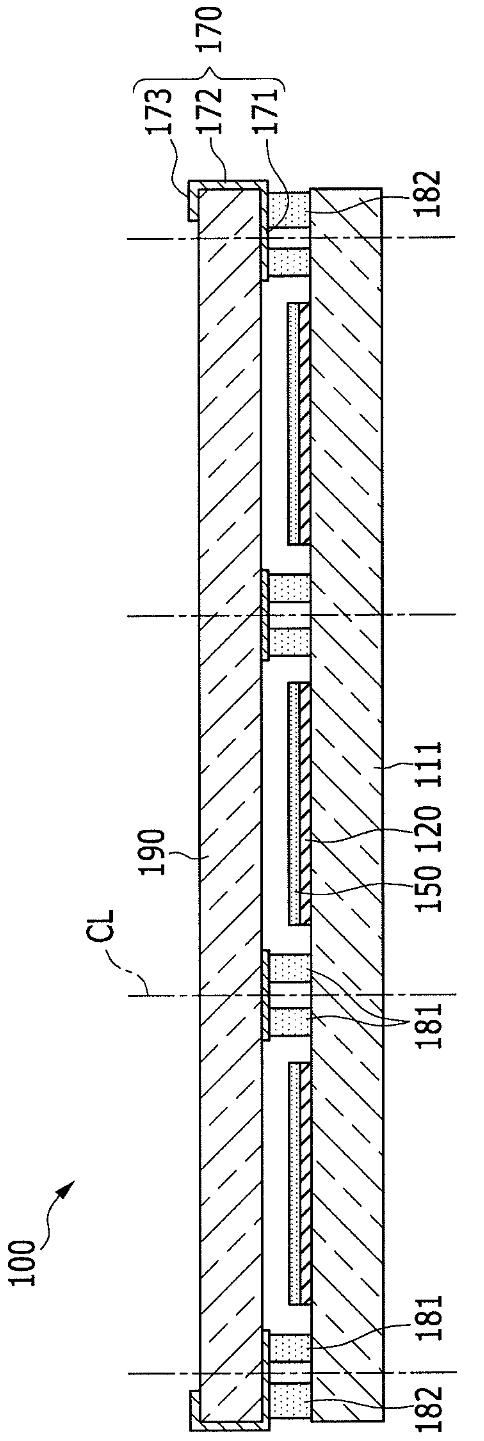
FIG. 2 is a cross-sectional view of a processing object panel of FIG. 1.

As shown in FIG. 2, the processing object panel 100 includes a first substrate 111 and a second substrate 190 arranged opposite to each other, and sealant 181 and 182 and a conductive layer pattern 170 disposed between the first substrate 111 and the second substrate 190 and combining and sealing the first and second substrates 111 and 190. The first substrate 111 faces the panel supporting unit 200. The conductive layer pattern 170 may be formed at the second substrate 190. The conductive layer pattern 170 may also be formed at the first substrate 111.

The first and second substrates 111 and 190 may be formed with various material disclosed in the prior art such as glass, quartz, and ceramic.

A driving circuit unit 120 and an organic light emitting element 150 are formed on the first substrate 111. In one embodiment, the driving circuit unit 120 is formed with circuit elements including a plurality of thin film transistors and capacitors, and drives the organic light emitting element 150. The organic light emitting element 150 is electrically connected to the driving circuit unit 120 such that light is emitted according to a driving signal transmitted from the driving circuit unit 120. The driving circuit unit 120 and the organic light emitting element 150 may be formed with commercially available various structures.

In FIG. 2, the organic light emitting element 150 and the driving circuit unit 120 may be formed on the first substrate 111. The organic light emitting element 150 and the driving circuit unit 120 may also be formed at the second substrate 190.

In one embodiment, as shown in FIG. 2, the organic light emitting element 150 is formed in the space enclosed between the two substrates 111 and 190. A liquid crystal display may also be disposed in the space enclosed between the substrates 111 and 190.

The sealant includes a plurality of cell sealants 181 of a cell unit and an initial sealant 182 to stably combine the two substrates 111 and 190 before the processing object panel 100 is cut. The cell sealants 181 are formed to enclose the organic light emitting element 150. The processing object panel 100 combined through the sealant curing process is cut according to a cutting line CL and is divided into cell units. The cutting line CL is formed between the cell sealants 181.

Figure 3:
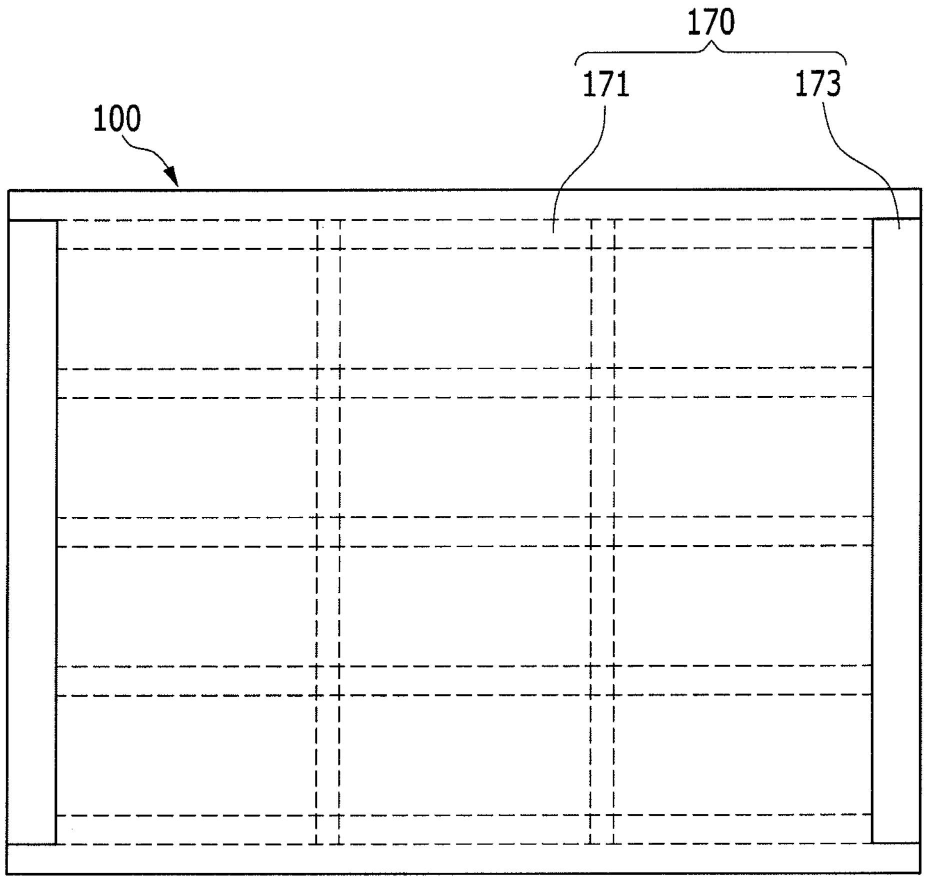
FIG. 3 is a top plan view of a conductive layer pattern of a processing object panel of FIG. 1.

The conductive layer pattern 170 includes a heating unit 171 including a lattice (grid) pattern, a connecting unit 173 electrically connected to the voltage applying unit 300 (see FIG. 1), and a coupling unit 172 connecting the heating unit 171 and the connecting unit 173. The heating unit 171 is formed to face the sealants 181 and 182. Particularly, the lattice pattern of the heating unit 171 is formed to face a plurality of cell sealants 181. FIG. 3 shows the lattice pattern of the heating unit 171 of the conductive layer pattern 170 formed at the processing object substrate 100.

In one embodiment, as shown in FIG. 2, the heating unit 171 is formed at the inner surface of the second substrate 190. The heating unit 171 may also be formed at a position corresponding to the sealant 181 and 182 at the outer surface of the processing object panel 100.

In one embodiment, as shown in FIG. 2, the connecting unit 173 is formed at the upper surface of the second substrate 190. The connecting unit 173 may also be formed at the side surface of the processing object panel 100.

The conductive layer pattern 170 may be made of a transparent conductive material or a metallic material such as indium tin oxide (ITO), indium zinc oxide (IZO), zinc oxide (ZnO), or indium oxide ($In_2O_3$).

Again referring to FIG. 1, the voltage applying unit 300 applies a predetermined voltage to the conductive layer pattern 170 of the processing object panel 100 to cure the sealants 181 and 182 of the processing object panel 100. The voltage applying unit 300 includes a first electrode 310 and a second electrode 320 having different polarities, and a power source 350 supplying electricity to the first and second electrodes 310 and 320.

The sealant curing apparatus 101 further includes i) first and second electrode transferring units 410 and 420 to move the first and second electrodes 310 and 320, respectively, ii) a controller 450 controlling the distance between the first and second electrodes 310 and 320 through the first and second electrode transferring units 410 and 420, and iii) a moving guide 430 providing a moving path of the electrode transferring units 410 and 420. Here, the first electrode 310 and the second electrode 320 have a predetermined length of the first direction X, and the moving guide 430 has a predetermined length of the second direction Y substantially perpendicular to the first direction X, and thereby the first electrode 310 and the second electrode 320 may be moved according to the moving guide 430 by the first electrode transferring unit 410 and the second electrode transferring unit 420. Accordingly, regardless of the size of the processing object panel 100 disposed to the supporting bar 210, the first and second electrodes 310 and 320 contact the connecting unit 173 of the conductive layer pattern 170 of the processing object panel 100, thereby applying the voltage.

If the voltage is applied to the conductive layer pattern 170 of the processing object panel 100 from the first electrode 310 and the second electrode 320, Joule heat is induced to the conductive layer pattern 170. By a high generated Joule heat, the sealants 181 and 182 formed at the position corresponding to the heating unit 171 of the conductive layer pattern 170 is cured.

When irradiating a laser to cure the sealants 181 and 182, the sealants 181 and 182 are partially cured such that uniform curing is difficult and a long time for curing the sealant 181 and 182 is required. In contrast, according to one embodiment, the sealants 181 and 182 are substantially simultaneously cured through the Joule heat generated in the conductive layer pattern 170 such that the sealants 181 and 182 may not only be substantially uniformly cured, but the sealant 181 and 182 may be cured during the relatively short time.

According to one embodiment, the position and the size of the processing object panel 100 disposed on the supporting bar 210 may be sensed through the sensors 212 formed at the supporting bar 210. The controller 450 may control the position of the electrodes 310 and 320 through the electrode transferring units 410 and 420 based on the sensed data. Accordingly, the sealant curing apparatus 101 may effectively execute the sealant curing process regardless of the size of the processing object panel 100.

Through these constitutions, the sealant curing apparatus 101 may substantially uniformly and effectively cure the sealants 181 and 182 in a large area process.

While the disclosed embodiments have been described in connection with the accompanying drawings, it is to be understood that the disclosed embodiments are not considered limiting, but, on the contrary, are intended to cover various modifications and equivalent arrangements included within the spirit and scope of the appended claims.

What is claimed is:

1. A sealant curing apparatus comprising:

a processing object panel;

a panel supporting unit configured to support the processing object panel; and a voltage applying unit comprising a first electrode and a second electrode that have different polarities and are positioned on the panel supporting unit, wherein the processing object panel is interposed between the voltage applying unit and the panel supporting unit, wherein the processing object panel comprises:

a conductive layer pattern comprising i) a heating unit including a lattice pattern, ii) a connecting unit coupled to the first and second electrodes, and iii) a coupling unit interconnecting the heating unit and the connecting unit; and a sealant formed to correspond to the pattern of the heating unit.

2. The sealant curing apparatus of claim 1, wherein the processing object panel further comprises a first substrate facing the panel supporting unit and a second substrate facing the voltage applying unit, wherein the sealant is formed between and combines the first and second substrates, and wherein the heating unit of the conductive layer pattern is formed at one surface of the second substrate so as to face the sealant.

3. The sealant curing apparatus of claim 2, wherein the sealant comprises a plurality of cell sealants formed as a cell unit, and wherein the lattice pattern included in the heating unit is formed to face the cell sealants.

4. The sealant curing apparatus of claim 1, further comprising:

first and second electrode transferring units configured to move the first and second electrodes, respectively; and a controller configured to control the distance between the first and second electrodes via the first and second electrode transferring units.

5. A sealant curing apparatus comprising:

a processing object panel;

a panel supporting unit configured to support the processing object panel; and a voltage applying unit comprising a first electrode and a second electrode that have different polarities and are positioned on the panel supporting unit, wherein the processing object panel is interposed between the voltage applying unit and the panel supporting unit, wherein the processing object panel comprises:

a conductive layer pattern comprising i) a heating unit including a lattice pattern, ii) a connecting unit coupled to the first and second electrodes, and iii) a coupling unit interconnecting the heating unit and the connecting unit; and a sealant formed to correspond to the pattern of the heating unit wherein the apparatus further comprises:

first and second electrode transferring units configured to move the first and second electrodes, respectively;

a controller configured to control the distance between the first and second electrodes via the first and second electrode transferring units; and a moving guide configured to provide a moving path of the first and second electrode transferring units.

6. A sealant curing apparatus comprising:

a processing object panel;

a panel supporting unit configured to support the processing object panel; and a voltage applying unit comprising a first electrode and a second electrode that have different polarities and are positioned on the panel supporting unit, wherein the processing object panel is interposed between the voltage applying unit and the panel supporting unit, wherein the processing object panel comprises:

a conductive layer pattern comprising i) a heating unit including a lattice pattern, ii) a connecting unit coupled to the first and second electrodes, and iii) a coupling unit interconnecting the heating unit and the connecting unit; and a sealant formed to correspond to the pattern of the heating unit wherein the apparatus further comprises:

first and second electrode transferring units configured to move the first and second electrodes, respectively; and a controller configured to control the distance between the first and second electrodes via the first and second electrode transferring units, wherein the panel supporting unit comprises i) a supporting bar configured to receive the processing object panel, ii) a supporting bar transferring unit configured to move the supporting bar, and iii) a supporting bar driver configured to control the supporting bar transferring unit.

7. The sealant curing apparatus of claim 6, wherein at least one vacuum hole is defined in the supporting bar, and wherein the sealant curing apparatus further comprises a vacuum pump connected to the vacuum hole.

8. The sealant curing apparatus of claim 6, wherein the supporting bar comprises a plurality of sensors configured to sense the size of the processing object panel.

9. The sealant curing apparatus of claim 8, wherein the controller is configured to control the distance between the first and second electrodes via the first and second electrode transferring units according to the size of the processing object panel sensed by the sensors.

* * * * *